US009667056B2

(12) United States Patent
Luebke et al.

(10) Patent No.: US 9,667,056 B2
(45) Date of Patent: May 30, 2017

(54) MICROGRID SYSTEM STRUCTURED TO DETECT OVERLOAD CONDITIONS AND TAKE CORRECTIVE ACTIONS RELATING THERETO

(71) Applicant: EATON CORPORATION, Cleveland, OH (US)

(72) Inventors: Charles John Luebke, Hartland, WI (US); Thomas J. Schoepf, Stuttgart (DE)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 15/189,549

(22) Filed: Jun. 22, 2016

(65) Prior Publication Data
US 2016/0308348 A1 Oct. 20, 2016

Related U.S. Application Data

(63) Continuation of application No. 14/264,409, filed on Apr. 29, 2014, now Pat. No. 9,413,195.

(51) Int. Cl.
| | |
|---|---|
| H02H 3/00 | (2006.01) |
| H02H 7/00 | (2006.01) |
| H02H 3/38 | (2006.01) |
| H04B 3/54 | (2006.01) |
| H02H 3/08 | (2006.01) |
| H02J 13/00 | (2006.01) |

(Continued)

(52) U.S. Cl.
CPC .............. *H02H 3/38* (2013.01); *H01H 83/20* (2013.01); *H02H 3/08* (2013.01); *H02J 3/005* (2013.01);
(Continued)

(58) Field of Classification Search
CPC ...... H02J 13/0062; H02J 13/002; H04B 3/54; H02H 3/08; Y10T 307/944; Y02E 40/72; Y04S 10/123
(Continued)

(56) References Cited

U.S. PATENT DOCUMENTS

| | | |
|---|---|---|
| 4,428,022 A | 1/1984 | Engel et al. |
| 5,525,985 A | 6/1996 | Schlotterer et al. |

(Continued)

OTHER PUBLICATIONS

European Patent Office, "International Search Report and Written Opinion for PCT/US2015/022632", Jul. 23, 2015, 9 pp.

*Primary Examiner* — Thienvu Tran
*Assistant Examiner* — Lucy Thomas
(74) *Attorney, Agent, or Firm* — Eckert Seamans Cherin & Mellott, LLC; Grant E. Coffield; Philip E. Levy

(57) ABSTRACT

A distribution manager includes a main bus, a first connection coupled to the main bus through a first circuit breaker and being structured to couple the distribution manager to an inter-microgrid connection system, a second connection coupled to the main bus through a second circuit breaker and being structured to couple the distribution manager to the inter-microgrid connection system, and a third circuit breaker coupled to the main bus and being structured to be coupled to a load. The distribution manager is configured to detect an overload condition and in response thereto (i) request to bring an offline distributed source online, (ii) if an offline distributed source cannot be brought online, request to shed the load, and (iii) if the load cannot be shed, cause the second circuit breaker to downwardly adjust the trip curve thereof.

16 Claims, 4 Drawing Sheets

(51) Int. Cl.
*H02J 3/14* (2006.01)
*H02J 3/38* (2006.01)
*H01H 83/20* (2006.01)
*H02J 3/00* (2006.01)

(52) U.S. Cl.
CPC ............ *H02J 3/14* (2013.01); *H02J 3/383* (2013.01); *H02J 13/002* (2013.01); *H02J 13/0006* (2013.01); *H02J 13/0062* (2013.01); *H04B 3/54* (2013.01); *Y02E 10/563* (2013.01); *Y02E 40/72* (2013.01); *Y04S 10/123* (2013.01); *Y10T 307/944* (2015.04)

(58) Field of Classification Search
USPC ...................................................... 361/63, 42
See application file for complete search history.

(56) References Cited

U.S. PATENT DOCUMENTS

| | | |
|---|---|---|
| 5,905,616 A | 5/1999 | Lyke |
| 5,910,760 A | 6/1999 | Malingowski et al. |
| 6,144,271 A | 11/2000 | Mueller et al. |
| 7,834,479 B2 | 11/2010 | Capp et al. |
| 8,447,435 B1 | 5/2013 | Miller et al. |
| 8,588,991 B1 | 11/2013 | Forbes, Jr. |
| 2009/0122453 A1* | 5/2009 | Vicente ............ H01H 71/7409 361/93.3 |
| 2011/0282507 A1 | 11/2011 | Oudalov et al. |
| 2012/0175955 A1 | 7/2012 | Carralero et al. |
| 2013/0289787 A1* | 10/2013 | Rouse .................. G06Q 50/06 700/291 |

* cited by examiner

MICROGRID SYSTEM STRUCTURED TO DETECT OVERLOAD CONDITIONS AND TAKE CORRECTIVE ACTIONS RELATING THERETO

CROSS-REFERENCE TO RELATED APPLICATIONS

This application is a continuation of, and claims priority under 35 U.S.C. §120 from, U.S. patent application Ser. No. 14/264,409, filed Apr. 29, 2014, entitled "MICROGRID SYSTEM STRUCTURED TO DETECT OVERLOAD CONDITIONS AND TAKE CORRECTIVE ACTIONS RELATING THERETO", the contents of which are incorporated herein by reference.

This application is related to commonly assigned, co-pending U.S. patent application Ser. No. 14/098,727, filed Dec. 6, 2013, entitled "System and Method for Adjusting the Trip Characteristics of a Circuit Breaker".

BACKGROUND

Field

The disclosed concept pertains generally to microgrid systems, and, more particularly, to a microgrid system structured to detect overload conditions and take corrective actions relating thereto.

Background Information

A distributed power source is a small-scale power generation mechanism used to provide an alternative to or an enhancement of the traditional electric power system. Distributed power sources include, for example and without limitation, photovoltaic (PV) modules, wind turbine modules, backup generators, energy storage, and uninterruptible power supplies.

A microgrid is a discrete energy system consisting of a number of distributed energy sources and loads capable of operating in parallel with, or independently from, the main grid. When connected to the main grid, a microgrid will rely on a mix of power generation sources depending on the metric to be optimized (cost, greenhouse gas emissions, reliability). In the case where the microgrid is operating independently from the main grid (e.g., when the point of common coupling with the main grid has been be disconnected), the microgrid is typically said to be operating in an islanded mode.

Microgrids are desirable as the multiple dispersed generation sources of a microgrid and the ability to isolate the microgrid from a larger network generally provide highly reliable electric power. Typically, specialized hardware and software systems control the integration and management of the microgrid's components and the connection to the main grid.

Power distribution equipment and conductors in a microgrid can be subjected to overcurrent conditions where multiple sources are feeding into a shared/common bus, and/or where multiple loads may be present (or added). Currently, the busbars and conductors in a microgrid system are typically oversized to accommodate worst case conditions (maximum source current and maximum load). It would be advantageous to be able to coordinate the total current permitted on the common bus of a microgrid, as that would allow for optimizing the size (and cost) of the common bus conductors, as well as allow for new sources or loads to be plugged in or added over time at any power port on the microgrid system without concern for overload currents to become present on the common bus. This is of particular concern for a power flow topology that may evolve/change over time and allows for bidirectional power ports.

SUMMARY

In one embodiment, a distribution manager is provided that includes a main bus, a first connection coupled to the main bus through a first circuit breaker, the first connection being structured to couple the distribution manager to an inter-microgrid connection system at a first location, a second connection coupled to the main bus through a second circuit breaker, the second connection being structured to couple the distribution manager to the inter-microgrid connection system at a second location, the second circuit breaker having a selectively adjustable trip curve, and a third circuit breaker coupled to the main bus, the third circuit breaker being structured to be coupled to a load. The distribution manager is structured and configured to detect an overload condition on the inter-microgrid connection system and in response thereto (i) request to bring an offline distributed source coupled to the main bus online, (ii) if an offline distributed source coupled to the main bus cannot be brought online, request to shed the load, and (iii) if the load cannot be shed, cause the second circuit breaker to downwardly adjust the selectively adjustable trip curve thereof.

In another embodiment, a method of alleviating an overload condition on an inter-microgrid connection system of a microgrid system is provided. The method includes detecting the overload condition in a distribution manager of the microgrid system, in response to detecting the overload condition, requesting to bring an offline distributed source coupled to the distribution manager online, if an offline distributed source coupled to the distribution manager cannot be brought online, requesting to shed a non-critical load coupled to the distribution manager, and if a non-critical load cannot be shed, causing a trip curve of a circuit breaker forming part of the distribution manager to be downwardly adjusted.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
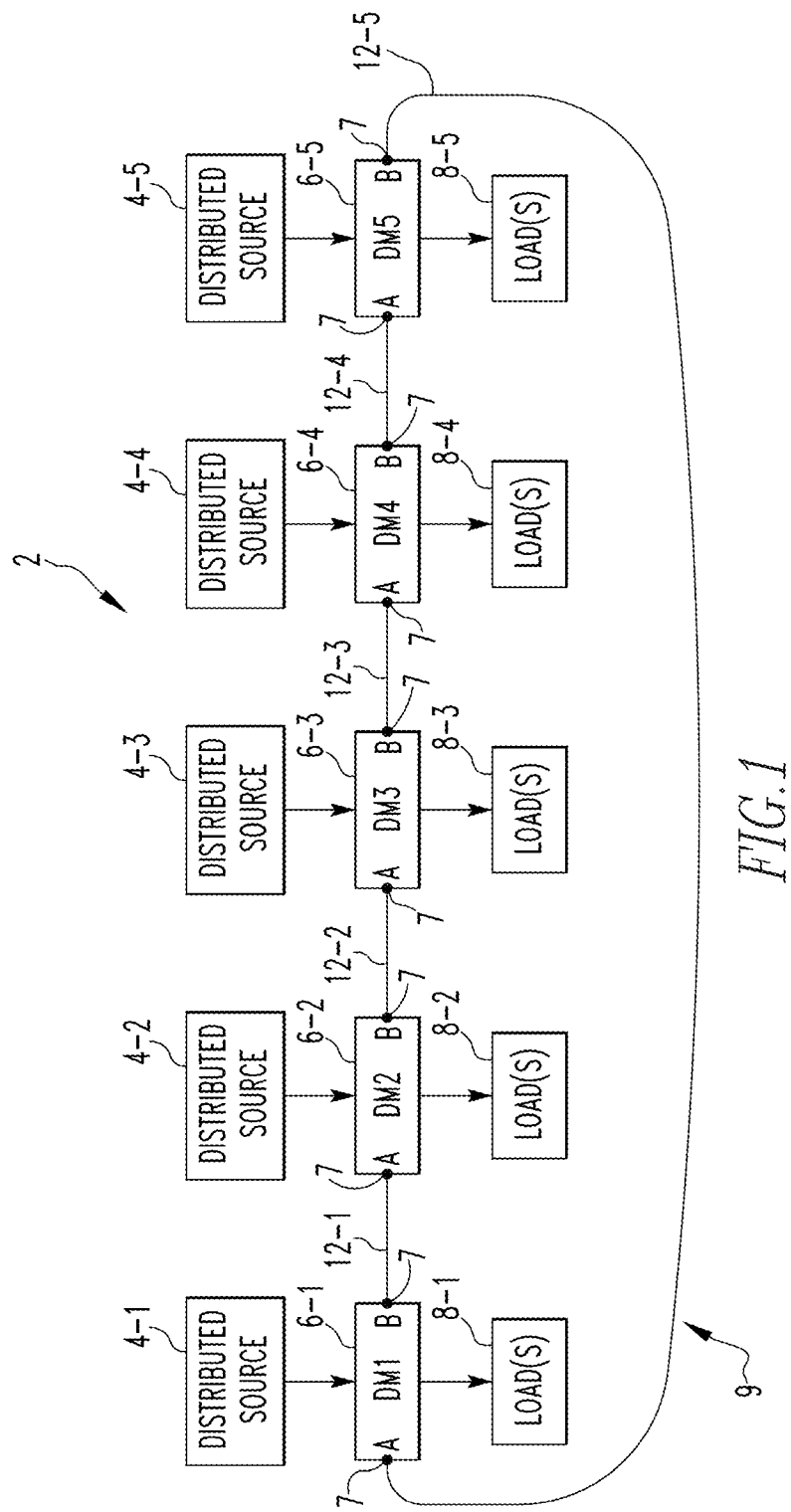
FIG. 1 is a schematic diagram of a microgrid system according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

FIG. 1 is a schematic diagram of a microgrid system 2 according to an exemplary embodiment of the disclosed concept. As described in greater detail herein, according to the disclosed concept, microgrid system 2 is structured and configured to recognize an overload condition on the common bus thereof and, in response thereto, take an action to alleviate the overload condition, such as bringing additional power sources online, shedding appropriate loads, and/or adjusting circuit breaker trip settings.

Referring to FIG. 1, microgrid system 2 includes a number of distributed sources 4, wherein each distributed source 4 is, for example and without limitation, a photovoltaic (PV) module, a wind turbine module, a backup generator, an energy storage module, or an uninterruptible power supply. In the exemplary embodiment shown in FIG. 1, microgrid system 2 includes five distributed sources 4 (labeled 4-1, 4-2, 4-3, 4-4, and 4-5). It will be understood, however, that that is meant to be exemplary only and that microgrid system 2 may include more than or less than five distributed sources 4 within the scope of the disclosed concept. In addition, as seen in FIG. 1, each distributed source 4 is operatively coupled to a distribution manager 6 (labeled 6-1, 6-2, 6-3, 6-4, and 6-5) that, as described herein, functions to control the flow of power in microgrid system 2. Furthermore, each distribution manager 6 is coupled to and feeds a number of loads 8 (labeled 8-1, 8-2, 8-3, 8-4, and 8-5).

In addition, in the illustrated embodiment, distribution managers 6-1, 6-2, 6-3, 6-4, and 6-5 are coupled together in a ring configuration by an inter-microgrid connection 9 comprising a number of ring conductors 12 (labeled 12-1, 12-2, 12-3, 12-4, and 12-5). In the non-limiting exemplary embodiment, microgrid system 2 is a three phase AC system and each ring conductor 12 includes separate conductors for each phase. It will be understood, however, that other configurations are also possible. In the exemplary ring configuration embodiment of FIG. 1, and as described elsewhere herein (FIG. 2), each distribution manager 6 has two ring bus connections 7, labeled A and B. As seen in FIG. 1, ring conductor 12-1 is provided between the ring bus connection 7-B of distribution manager 6-1 and the ring bus connection 7-A of distribution manager 6-2, ring conductor 12-2 is provided between the ring bus connection 7-B of distribution manager 6-2 and the ring bus connection 7-A of distribution manager 6-3, ring conductor 12-3 is provided between the ring bus connection 7-B of distribution manager 6-3 and the ring bus connection 7-A of distribution manager 6-4, ring conductor 12-4 is provided between the ring bus connection 7-B of distribution manager 6-4 and the ring bus connection 7-A of distribution manager 6-5, and ring bus conductor 12-5 is provided between the ring bus connection 7-B of distribution manager 6-5 and the ring bus connection 7-A of distribution manager 6-1. The inter-microgrid connection 9 is bidirectional in that it permits power flow to and from each distribution manager 6. Thus, each distribution manager 6 is capable of providing power to or receiving power from another distribution manager 6 depending on the instantaneous power needs and availabilities within microgrid system 2, with the direction of power flow being controlled in real time and near-instantaneously.

Moreover, while in the exemplary embodiment microgrid system 2 employs a ring bus configuration, it will be understood that other interconnection topologies, such as a serial bus configuration (daisy chain), and fan out configuration or a star configuration, or some combination thereof, or mesh are also possible within the scope of the disclosed concept.

Figure 2:
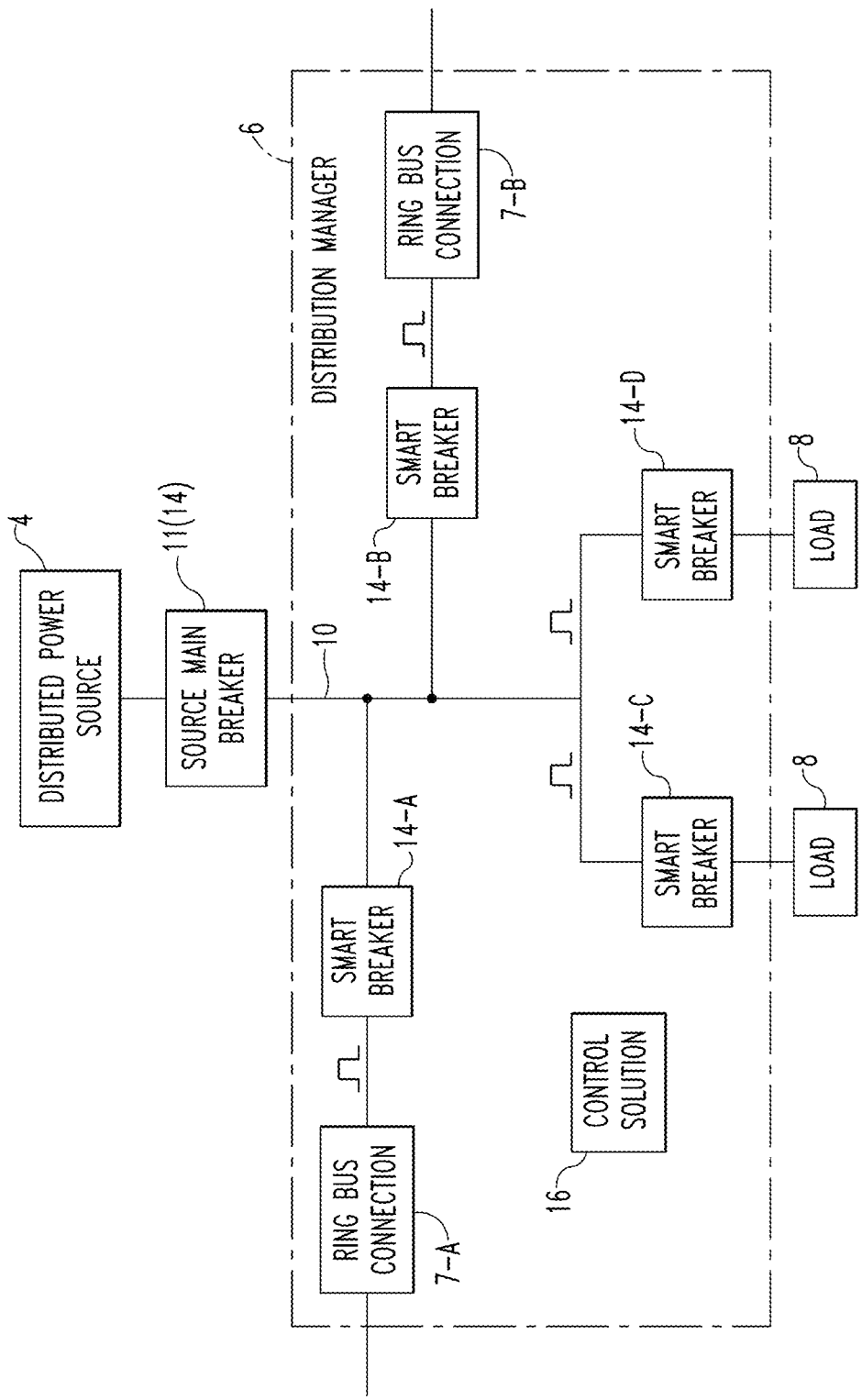
FIG. 2 is a schematic diagram showing a portion of the microgrid system of FIG. 1 with a more detailed schematic of the distribution manager thereof.

FIG. 2 is a schematic diagram showing a portion of microgrid system 2 with a more detailed schematic of distribution manager 6 according to an exemplary embodiment of the disclosed concept. As seen in FIG. 2, distribution manager 6 includes a main busbar 10, with distributed source 4 being coupled to main busbar 10 through a source main circuit breaker 11. In the exemplary embodiment, distributed source 4 may be selectively taken offline and selectively placed online by opening and closing source main circuit breaker 11 or via a command directly to distributed source 4 to turn on and off. The significance of this feature is described elsewhere herein. As mentioned above, distribution manager 6 further includes ring bus connection 7-A and ring bus connection 7-B. Ring bus connection 7-A is electrically coupled to main busbar 10 through a smart breaker 14 (labelled 14-A), and similarly ring bus connection 7-B is electrically coupled to main busbar 10 through a smart breaker 14 (labelled 14-B). In addition, each load 8 is coupled to main busbar 10 through a respective smart breaker 14 (labelled 14-C and 14-D, respectively). Smart breaker 14 according to one exemplary embodiment is described below in connection with FIGS. 3 and 4. In one particular embodiment, source main circuit breaker 11 may also have the form and functionality of smart breaker 14. Also, each Smart Breaker 14 could be for a source or load or inter-microgrid connection depending on the wiring topology (bus, ring, star, mesh, daisy chain) and the power flow direction at a particular point in time. For example, an energy storage device connected via a smart breaker may be delivering power or being charged depending on the power sources and demands on the rest of the microgrid.

Finally, in the exemplary embodiment, distribution manager 6 includes a control solution 16 that provides a high level coordination function for distribution manager 6. For example, control solution 16 may be operatively coupled to and configured to control certain aspects of source main circuit breaker 11 and/or each of the smart breakers 14. For ease of illustration and clarity, the actual electrical connections between control solution 16 and source main circuit breaker 11 and each of the smart breakers 14 are not shown.

Figure 3:
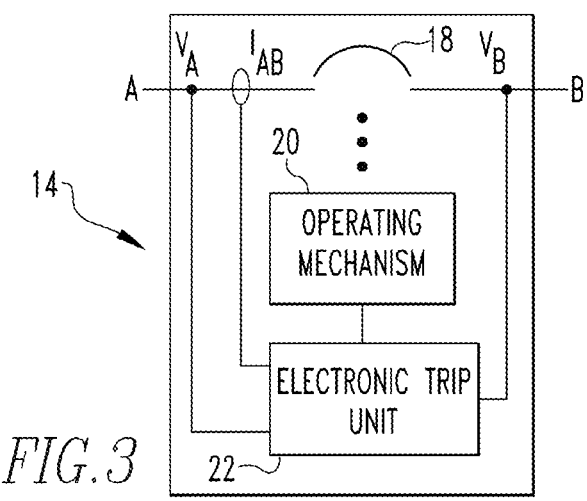
FIG. 3 is a schematic diagram of a smart breaker forming part of the distribution manager of FIG. 2 according to an exemplary embodiment of the disclosed concept.

In the non-limiting exemplary embodiment, each smart breaker 14 is a configurable circuit interrupter (such as a molded case circuit breaker (MCCB) with a dynamically adjustable trip curve having the structure shown in FIGS. 3 and 4 (described below). Smart breakers 14 are configured to protect microgrid system 2 from damage due to an overcurrent condition. Referring to FIG. 3, smart breaker 14 includes separable contacts 18, an operating mechanism 20 structured to open and close separable contacts 18, and an electronic trip unit 22 which cooperates with operating mechanism 20 to trip open separable contacts 18. Current and voltage sensors between the A and B terminals provide signal inputs to electronic trip unit 22.

Figure 4:
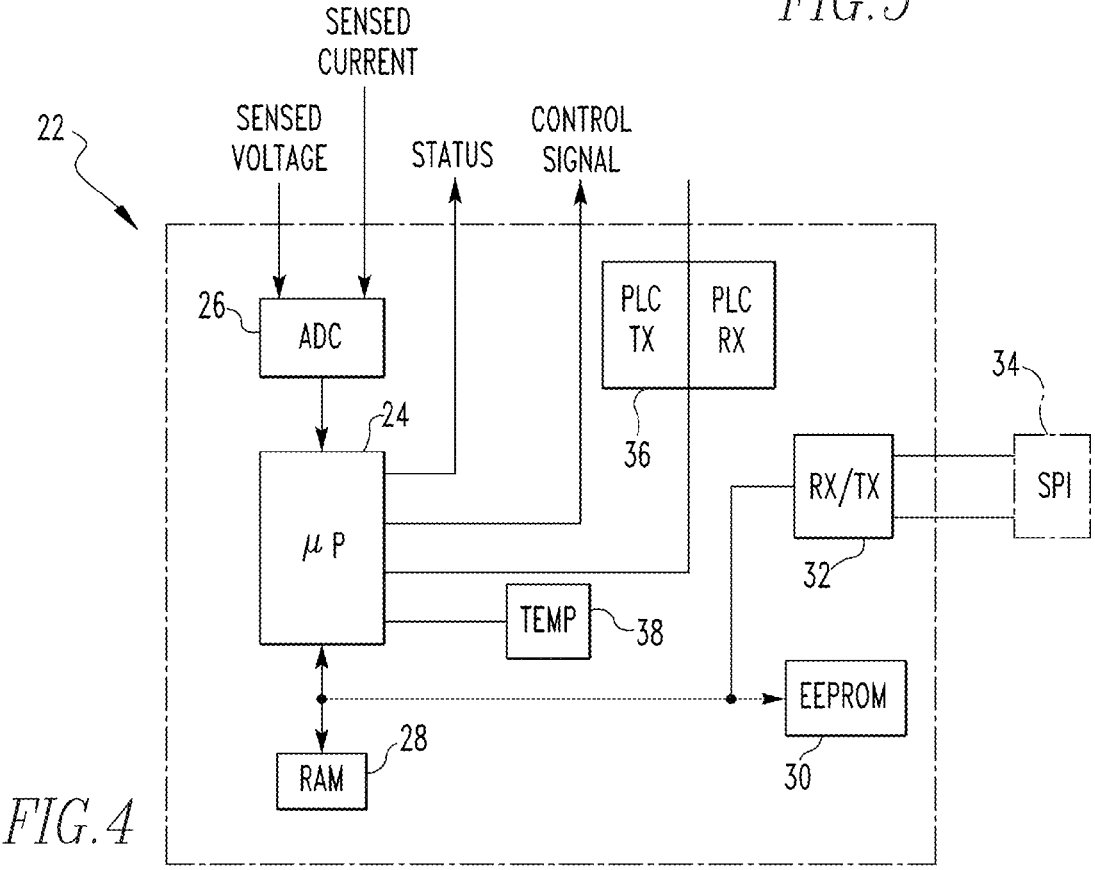
FIG. 4 is a schematic diagram of an electronic trip unit forming part of the smart breaker of FIG. 3 according to an exemplary embodiment of the disclosed concept.

FIG. 4 is a schematic diagram showing certain selected components of electronic trip unit 22 according to the exemplary embodiment. As seen in FIG. 4, electronic trip unit 22 includes a microprocessor (µP) 24 which controls the operating mechanism 20 via a control signal. Alternatively, microprocessor 24 may be another type of processing or control unit, such as, without limitation, a microcontroller or some other suitable processing device. Electronic trip unit 22 further includes an analog-to-digital converter (ADC) 26, a random access memory (RAM) 28 and an EEPROM 30, each of which is coupled to microprocessor 24. ADC 26 is structured to receive signals, such as a number of current signals (indicating the current of the circuit to which smart breaker 14 is connected) and voltages (indicating the voltage of the circuit for each side of the smart breaker 14), that are sensed by sensors (not shown; e.g., a number of current transformers or Rogowski coils) forming part of smart breaker 14 and convert those signals to digital data that is appropriate for microprocessor 24. As will be appreciated, that data may be stored in RAM 28 and/or used by the trip unit program implemented in and run by microprocessor 24 in determining whether and when to issue a trip signal for tripping operating mechanism 20. As described in greater detail herein, that data (e.g., current data) may also be used by microprocessor 24 (as a trigger) to cause smart breaker 14 to generate and transmit one or more signals (via PLC communications in the exemplary embodiment as described below) to other components of microgrid system 2 in order to cause certain actions to occur which may alleviate a detected overcurrent condition.

Figure 5:
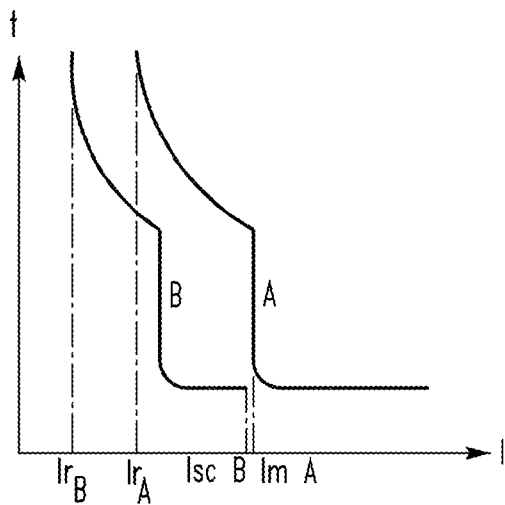
FIG. 5 illustrates adjustment of the trip curve of the smart breaker of FIG. 3 according to an exemplary embodiment of the disclosed concept.

In addition, in the exemplary embodiment, EEPROM 30 stores (in nonvolatile memory) the functional trip settings (such as, for example and without limitation, long delay pickup (Ir), long delay time (LDT), short delay pickup (SDPU), ground fault pickup (GFPU), and short delay time and ground fault time (SDT/GFT)) of electronic trip unit 22 which define the operating characteristics of thereof, and which are read into microprocessor 24 as needed by the trip unit program. Temperature input 38 can be used by the microprocessor 24 to provide temperature compensation for the trip curve. Electronic trip unit 22 also includes a communication interface 32 coupled to a serial port interface (SPI) 34, which in turn is operatively coupled to microprocessor 24 to allow for serial communication with microprocessor 24. This can provide a means to remotely communicate and display to indicate the percent current present on the conductor or busbar including an overload condition and impending trip. Finally, electronic trip unit 22 further includes a power line carrier (PLC) transceiver 36 coupled to the circuit too which smart breaker 14 is connected. PLC transceiver 36 is also coupled to microprocessor 26. PLC transceiver 36 is structured and configured to enable smart breaker 14 to communicate with other components of microgrid system 2 using PLC output signals (comprising a number of pulses). One capability of smart breaker 14 is that its trip curve (i.e., functional trip settings) may be dynamically adjusted (in response to signals received via PLC transceiver 36) as demonstrated in FIG. 5, wherein trip curve A is a default trip curve and trip curve B is a downwardly adjusted trip curve.

Figure 6:
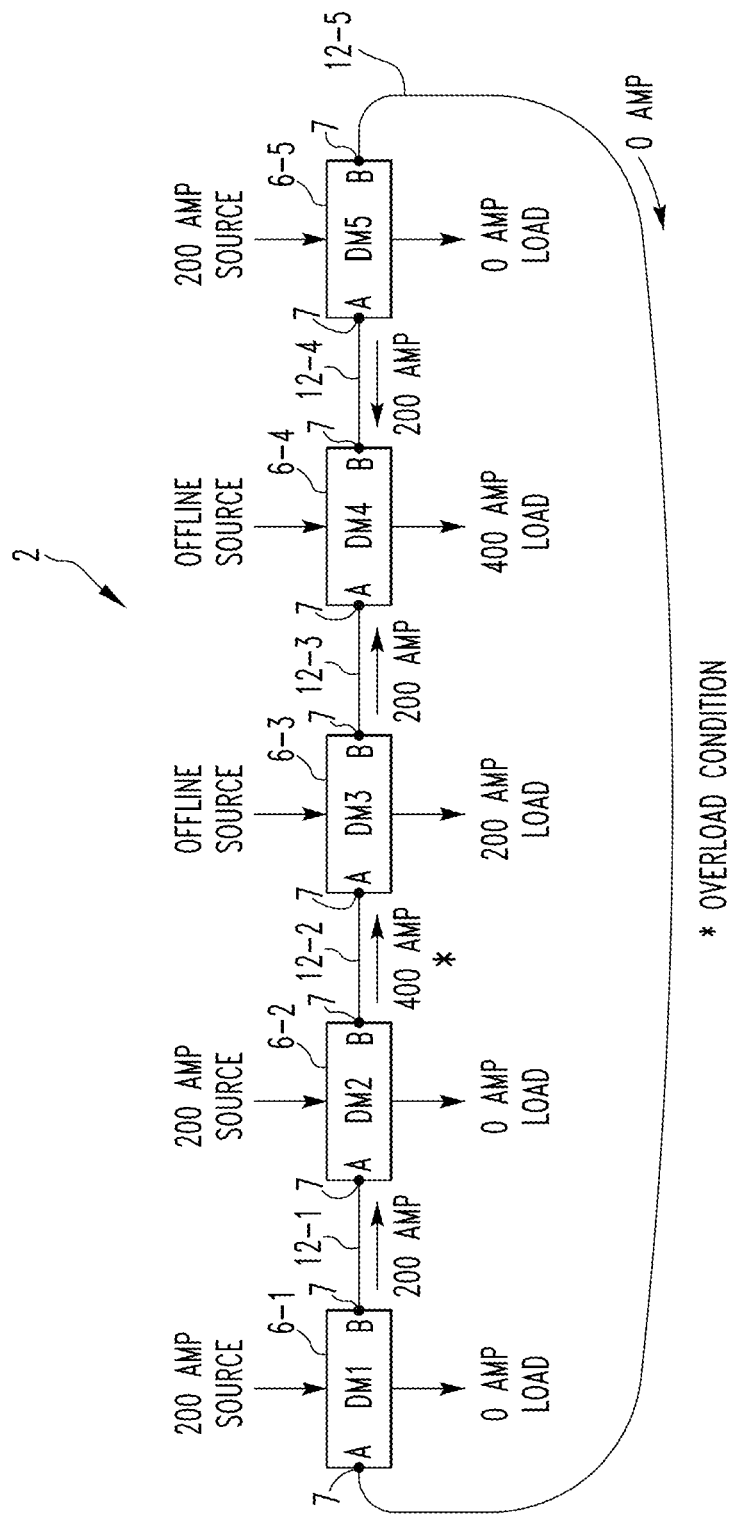
FIG. 6 is a schematic diagram of the microgrid system of FIG. 1 that illustrates an overload condition on that system.

Operation of microgrid system 2 according to the disclosed concept will now be described in connection with FIG. 6, which shows an overload condition being present on microgrid system 2. In particular, in the present, non-limiting example, each main busbar 10 and each ring conductor 12 is rated for 200 A, each of the distributed sources 4-1, 4-2 and 4-5 is a 200 A source, and distributed sources 4-3 and 4-4 are each currently offline. In addition, as seen in FIG. 6, microgrid system 2 is attempting to provide power to load 8-3, which is a 200 A load, and load 8-4, which is a 400 A load. To do so, distribution manager 6-1 is providing 200 A (from distributed source 4-1) to distribution manager 6-2, and distribution manager 6-2 is passing that current through it along with 200 A from distributed source 4-2. That 400 A is being provided to distribution manager 6-3 so that 200 A can be provided to load 8-3 and 200 A can be passed through to distribution manager 6-4. Distribution manager 6-5 is also providing 200 A (from distributed source 4-5) to distribution manager 6-4, so that the total current being provided to load 8-4 is 400 A. The problem with such a configuration is that, as shown in FIG. 6, it will result in an overcurrent condition (see * in FIG. 6) on ring conductor 12-2.

According to the disclosed concept, microgrid system 2 is structured and configured to take certain corrective actions aimed at alleviating the overcurrent condition just described to protect internal and external conductors, terminals, joints, and busbars. More specifically, in distribution manager 6-3, smart breaker 14-A thereof connected to ring bus connection 7-A (referred to in the present example as smart breaker 14-A) will sense that 400 A is being drawn into ring bus connection 7-A, and that such a current level is an overcurrent condition. Smart breaker 14-A is structured and configured to, in response to detecting the overcurrent condition on ring conductor 12-2, take one of the following three actions in the following priority order. First, smart breaker 14-A will request to bring online an additional, local distributed power source 4 that is currently offline. More specifically, smart breaker 14-A will generate PLC signals requesting that source main circuit breaker 11 of distribution manager 6-3 be closed so that distributed source 4-3 of distribution manager 6-3 will come online and deliver additional current to distribution manager 6-3. Such an additional current, if successfully provided, will alleviate the overcurrent condition on ring conductor 12-2 (only 200 A will be needed on ring conductor 12-2 to satisfy the needs of distribution manager 6-4). Distribution manager 6-3 (DM3) will also send PLC signals to the downstream distribution manager 6-4 (DM4) (based on power flow) requesting that distribution manager 6-4 also take action to eliminate the overcurrent condition. If, however, one or more additional, local distributed power sources 4 cannot be brought online in a manner that would alleviate the overcurrent condition on ring conductor 12-2, smart breaker 14-A will next request that one or more local loads 8-3 be shed to alleviate the overcurrent condition. In the exemplary embodiment, smart breaker 14-A will do so by generating and sending to the smart breaker 14-C or D of the load(s) 8-3 PLC signals requesting that the smart breaker 14-C or D be opened. It will be understood, however, that shedding of loads may occur at a breaker, a receptacle (e.g., a smart receptacle may be located between smart breaker 14D and load 8D in FIG. 2) or a load itself If the associated load(s) is/are not critical, the smart breaker 14-C or D of the load(s) 8-3 will respond by opening. If, however, the associated load(s) is/are critical and thus cannot be shed, the smart breaker 14-C,D of the load(s) 8-3 will respond by generating and sending PLC response signals to the smart breaker 14-A indicating that the loads(s) 8-3 cannot be shed. In response, smart breaker 14-A will generate and send to the smart breaker 14-B of distribution manager 6-3 that connected to ring bus connection 7-B (referred to in the present example as smart breaker 14-B) PLC signals requesting that smart breaker 14-B to adjust its trip curve downward (i.e., to de-rate smart breaker 14-B). The de-rating of smart breaker 14-B will cause it to trip sooner responsive to the overcurrent condition, and will allow 200 A to be provided to the critical load 8-3 from distribution manager 6-2. An alternative priority is to maintain the overcurrent rating of the smart breaker 14-B for the ring bus connection, and to de-rate smart breaker 14-C or 14-D which are connected to one or more loads.

In addition, according to one particular embodiment of the disclosed concept, smart breaker 14-A is further structured and configured to, in response to detecting the overcurrent condition on ring conductor 12-2, generate and send to distribution manager 6-2 PLC signals requesting that distribution manager 6-2 not cause (i.e. delay) a breaker trip and instead continue to try to deliver the 400 A current while smart breaker 14-A of distribution manager 6-3 requests the corrective actions described above.

In an alternative embodiment, an assembly including a circuit breaker, a receptacle, a distributed plug inverter (DPI) and a distributed source as described in U.S. application Ser. No. 14/098,727 (the disclosure of which is incorporated herein by reference) may be connected to the main busbar 10 of any of the distribution managers 6 to provide an additional source of power to microgrid system 2. As a further alternative, an assembly including a circuit breaker, a smart receptacle, a microinverter and a distributed source as described in U.S. application Ser. No. 14/098,727 may instead be connected to the main busbar 10 of any of the distribution managers 6 to provide an additional source of power to microgrid system 2.

Thus, in the various embodiments described herein, microgrid system 2 employs a number of distribution manager 6 that are structured and configured to recognize overload conditions on microgrid system 2 and, in response thereto, attempt to take an action to alleviate the overload condition.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A distribution manager, comprising:
   a main bus;
   a first configurable circuit interrupter structured to couple the distribution manager to an inter-microgrid connection system; and
   a second circuit interrupter coupled to the main bus, the second circuit interrupter being structured to be coupled to a load;
   wherein the distribution manager is structured and configured to detect an overload condition on the inter-microgrid connection system and in response thereto (i) request to bring an offline distributed source coupled to the main bus online, (ii) if an offline distributed source coupled to the main bus cannot be brought online, request to shed the load, and (iii) if the load cannot be shed, cause the first configurable circuit interrupter to be de-rated.

2. The distribution manager according to claim 1, further comprising a third circuit interrupter structured to couple the distribution manager to the inter-microgrid connection system, wherein the third circuit interrupter is structured and configured to detect the overload condition and in response thereto (i) attempt to bring an offline distributed source coupled to the main bus online, (ii) if an offline distributed source coupled to the main bus cannot be brought online, attempt to shed the load, and (iii) if the load cannot be shed, cause the first configurable circuit interrupter to be de-rated by adjusting one or more functional trip settings of the first configurable circuit interrupter.

3. The distribution manager according to claim 2, wherein the third circuit interrupter is structured and configured to detect the overload condition and in response thereto (i) attempt to bring an offline distributed source coupled to the main bus online by generating one or more first signals and providing the one or more first signals to a circuit interrupter coupled to the offline distributed source, (ii) if an offline distributed source coupled to the main bus cannot be brought online, attempt to shed the load by generating one or more second signals and providing the one or more second signals to the second circuit interrupter, and (iii) if the load cannot be shed, cause the first configurable circuit interrupter to be de-rated by adjusting one or more functional trip settings of the first configurable circuit interrupter by generating one or more third signals and providing the one or more third signals to the first configurable circuit interrupter.

4. The distribution manager according to claim 3, wherein the one or more first signals, the one or more second signals and the one or more third signals are each power line carrier signals.

5. The distribution manager according to claim 1, wherein the inter-microgrid connection system is a ring bus.

6. The distribution manager according to claim 1, wherein the first configurable circuit interrupter has a temperature input and is structured to provide temperature compensation based on the temperature input.

7. The distribution manager according to claim 1, wherein the first configurable circuit interrupter has a communications interface and a processor that is structured to transmit through the communications interface information regarding a percent current present on the main bus and an indication of an overload condition and impending trip.

8. The distribution manager according to claim 1, wherein the distribution manager is further structured and configured to send a signal to a downstream distribution manager requesting the distribution manager to take action to eliminate the overcurrent condition.

9. The distribution manager according to claim 1, wherein the distribution manager is structured and configured to detect the overload condition and in response thereto, if the load cannot be shed, (i) cause the first configurable circuit interrupter to be de-rated by adjusting one or more functional trip settings thereof, or (ii) cause the second circuit interrupter to be de-rated by adjusting one or more functional trip settings thereof.

10. A microgrid system employing the distribution manager, the inter-microgrid connection system, the offline distributed source and the load of claim 1.

11. A method of operating a microgrid system, comprising:
    detecting an overload condition in a distribution manager of the microgrid system;
    in response to detecting the overload condition, requesting to bring an offline distributed source coupled to the distribution manager online;
    if an offline distributed source coupled to the distribution manager cannot be brought online, requesting to shed a non-critical load coupled to the distribution manager; and
    if a non-critical load cannot be shed, causing a circuit interrupter forming part of the distribution manager to be de-rated.

12. The method according to claim 11, wherein: (i) the attempting to bring an offline distributed source online includes generating one or more first signals and providing the one or more first signals to a circuit breaker coupled to the offline distributed source, (ii) the attempting to shed the non-critical load includes generating one or more second signals and providing the one or more second signals to a circuit breaker coupled to the non-critical load , and (iii) the causing the circuit interrupter to be de-rated includes generating one or more third signals and providing the one or more third signals to the circuit interrupter.

13. The method according to claim 12, wherein the one or more first signals, the one or more second signals and the one or more third signals are each power line carrier signals.

14. The method according to claim 11, wherein the detecting, the attempting to bring an offline distributed source coupled to the distribution manager online, the attempting to shed and the causing the circuit interrupter to be de-rated are performed by a second circuit interrupter forming part of the distribution manager.

15. The method according to claim 11, wherein the overload condition is on an inter-microgrid connection system.

16. The method according to claim 15, wherein the inter-microgrid connection system is a ring bus.

* * * * *